Feb. 23, 1932. A. G. HOLLMAN 1,846,420

BELT CLAMP

Filed Dec. 3, 1930

INVENTOR,
August G. Hollman;
BY Calvin Brown
ATTORNEY

Patented Feb. 23, 1932

1,846,420

UNITED STATES PATENT OFFICE

AUGUST G. HOLLMAN, OF FULLERTON, CALIFORNIA

BELT CLAMP

Application filed December 3, 1930. Serial No. 499,638.

This invention relates to clamps, and particularly to the type adapted to cooperate with belting to hold ends thereof in cooperative relation. More particularly, the invention has to do with a belting clamp adapted to cooperate with belting, such as used in oil well practice. Large belts are used to drive band wheels of oil well rigs, and often the belt will break or the belt must be replaced. When such an emergency arises, a clamp must be used for holding the ends of the belt. Ordinarily, a belt stretcher is employed and the clamp placed in position thereafter. The present clamp embodies novel features of construction whereby the belt is firmly held.

An object of the invention is the provision of a clamp which is formed to automatically engage the belt when any tension is placed upon the belt.

Another object is the provision of a clamp incorporating novel features of construction which render parts of said clamp replaceable at a minimum of expense in case said parts suffer injury.

Another object is the provision of a clamp embodying great strength with minimum weight.

A further object is the provision of a clamp which is inexpensive of manufacture, does not require expensive tools for its manufacture, and which is relatively superior to clamps now utilized for the same purpose.

With the above mentioned and other objects in view, the invention consists in the novel and useful provision, formation, construction, association and relative arrangement of parts, members and features, all as shown in a certain embodiment in the accompanying drawings, described generally, and more particularly pointed out in the claims.

Figure 3:
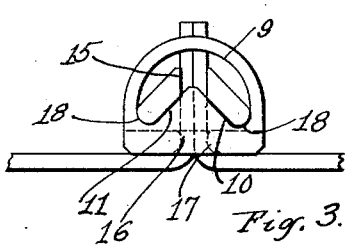
Figure 3 is an end elevation of the clamp.
Figure 5:
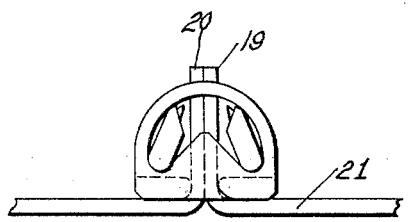
Figure 5 is a view similar to Figure 3, the jaws being opened.

Referring now to the drawings, the improved clamp is designated as an entirety by 1, and the same includes a clamp body 2 adapted to carry one or more jaws 3. In the present instance, two cooperating pairs of jaws are provided, as shown at 4 and 5. The clamp body includes a base member 6 provided with end members 7 and 8 substantially at right angles to the base member, and which end members are cut away as best shown in Figures 3 and 5. This cut-away portion is such as to provide an opening having a portion which is curved, as shown at 9, and with a pair of inclined wall portions as shown at 10 and 11, the curved portion merging into the inclined wall portions. This leaves what may be termed substantially a triangular piece against the legs of which, represented by the inclined walls 10 and 11, portions of the jaws 3 are adapted to rest when the jaws are in one position. The jaws include two elongated members extending between the end pieces and slightly beyond the ends, as indicated at 12, the jaws being passed through the cut-away portions of said end pieces. Both jaws are provided with a plurality of spaced apart tapered bores 13 and adapted to be received within said bores, and likewise to extend therefrom are tapered pins 14. Both jaws are provided with what may be termed a work engaging face 15, and the said tapered pins are adapted to extend beyond said working face. The base 6 is formed with an elongated slot 16 and edges of the base bounding said slot are curved as shown at 17.

The operation, uses and advantages of the invention are as follows:

It will be noted that both jaws have the edge opposite the work engaging face 15 curved as shown at 18 so as to be received within a like groove portion between the inclined walls 10 and 11 of the ends and the curved wall 9. Thus, when the ends 19 and 20 of a belt 21 pass through the slot 16 of the base and upwardly to the position shown in Figure 5, the jaws will be moved away from the inclined walls 10 and 11 of the ends. However, upon releasing the jaws, the ends of the tapered pins which act as impaling devices will directly contact and penetrate the belt ends 19 and 20, and when tension is placed upon the belt, the jaws will swing inwardly toward each other to where the base portion of said jaws will rest upon the inclined walls 10 and 11 of the ends. When this occurs, it will be noted that the work engaging face 15 of both jaws engages a surface of the belt ends. The belt ends are thus securely clamped and held against movement.

It will be immediately realized that a belt clamp of this character can be quickly positioned so as to hold belt ends and still allow the clamp to be readily removed if desired.

Figure 4:
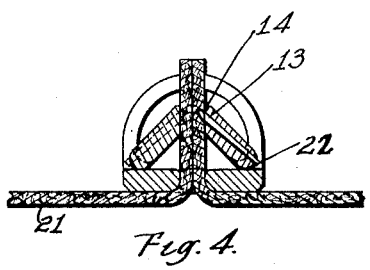
Figure 4 is a sectional view of the clamp in engagement with belting.

Slippage, however, during ordinary running of the belt is effectively prevented. If for some reason the tapered pins become damaged, the tapered pins may be readily removed from the jaws by striking an end thereof, say the end shown in Figure 4 at 22, and a new one replaced.

Figure 1:
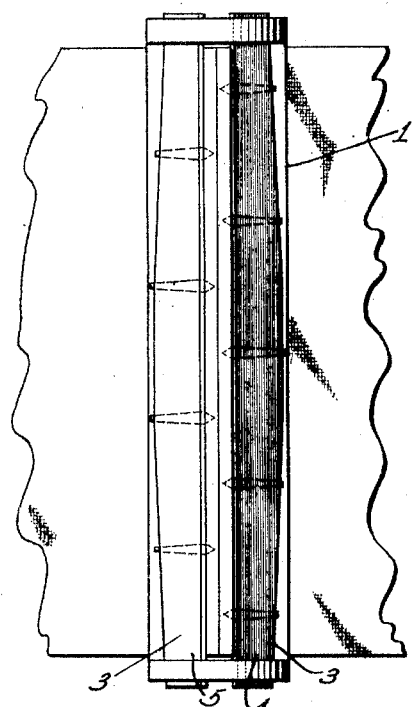
Figure 1 is a plan view of the clamp shown cooperating with a belt.
Figure 2:
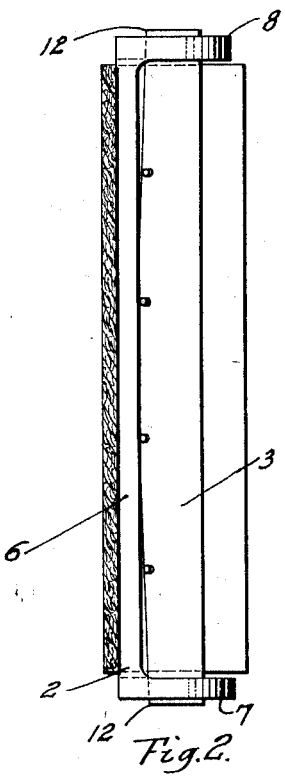
Figure 2 is a side elevation of the clamp.

Various refinements of detail may be entered into in the construction of such a clamp, such as illustrated in the drawings, wherein it will be seen that the jaws are constructed so as to present uniform strength throughout their length, such as by increasing the width of the jaw from the ends thereof toward the center, as illustrated in Figures 1 and 2.

It is obvious that various changes and modification and variations may be made in practicing the invention in departure from the particular showing of the drawings without, however, departing from the true spirit of the invention as defined by the scope of the appended claims.

I claim:

1. In a belt clamp, a body provided with a pair of end members; said end members being transversely slotted to provide inclined wall portions, and a pair of jaws extending between said end members of the body and adapted to rest when in one position against said inclined wall portions.

2. In a belt clamp, a body having a base portion provided with an elongated work receiving slot, a pair of end members secured to the base portion, said end members being slotted to provide a pair of inclined walls, and elongated jaws extending between said end members and adapted to rest when in one position against said inclined walls.

3. In a belt clamp, a body having a base portion provided with an elongated work receiving slot, a pair of end members secured to the base portion, said end members being slotted to provide a pair of inclined walls, elongated jaws extending between said end members and adapted to rest when in one position against said inclined walls, and impaling means carried by said jaws and whereby when work is passed through the work receiving slot of said base, said jaws may be swung to bring said impaling means into engagement with the said work and to grip the said work.

4. In a belt clamp, a clamp body including a base provided with a work receiving slot and formed with a pair of slotted end members, a pair of jaws extending between the end members and received in the slots thereof, both said jaws being provided with work engaging faces and whereby when work is passed through the work receiving slot of the base, the said jaws may be swung to grip said work, the said work receiving faces of said jaws substantially paralleling a gripped surface of said work.

5. In a belt clamp, a clamp body including a base provided with a work receiving slot and formed with a pair of slotted end members, a pair of jaws extending between the end members and received in the slots thereof, both said jaws being provided with work engaging faces, whereby when work is passed through the work receiving slot of the base, the said jaws may be swung to grip said work, the said work receiving faces of the said jaws substantially paralleling a gripped surface of said work, and impaling means for both said jaws for penetrating the said work.

In testimony whereof, I have signed my name to this specification at Los Angeles, California, this 25th day of November, 1930.

AUGUST G. HOLLMAN.